US009883346B2

(12) United States Patent
Chizi et al.

(10) Patent No.: US 9,883,346 B2
(45) Date of Patent: Jan. 30, 2018

(54) METHOD AND SYSTEM FOR OBTAINING DISTANCED AUDIO BY A PORTABLE DEVICE

(71) Applicant: DEUTSCHE TELEKOM AG, Bonn (DE)

(72) Inventors: Barak Chizi, Ashkelon (IL); Bracha Shapira, Beer Sheva (IL); David (Dudu) Mimran, Tel Aviv (IL)

(73) Assignee: Deutsche Telekom AG, Bonn (DE)

( * ) Notice: Subject to any disclaimer, the term of this patent is extended or adjusted under 35 U.S.C. 154(b) by 93 days.

(21) Appl. No.: 14/738,983

(22) Filed: Jun. 15, 2015

(65) Prior Publication Data
US 2015/0373498 A1 Dec. 24, 2015

(30) Foreign Application Priority Data

Jun. 19, 2014 (IL) ........................................ 233275

(51) Int. Cl.
H04W 4/02 (2009.01)
H04W 68/00 (2009.01)
H04M 3/42 (2006.01)
H04L 29/08 (2006.01)

(52) U.S. Cl.
CPC ............. *H04W 4/027* (2013.01); *H04L 67/26* (2013.01); *H04L 67/306* (2013.01); *H04M 3/42* (2013.01); *H04W 4/023* (2013.01); *H04W 4/026* (2013.01); *H04W 68/005* (2013.01)

(58) Field of Classification Search
CPC ....... H04M 3/42; H04W 68/00; H04W 4/027; H04W 68/005; H04W 4/026; H04W 4/023; H04L 67/26; H04L 67/306
See application file for complete search history.

(56) References Cited

U.S. PATENT DOCUMENTS

| 2007/0112762 | A1* | 5/2007 | Brubaker | .......... G06F 17/30867 |
| 2007/0150444 | A1* | 6/2007 | Chesnais | ................. H04W 4/02 |
| 2008/0015013 | A1* | 1/2008 | Gelman | ................. G07F 17/32 463/25 |

(Continued)

OTHER PUBLICATIONS

European Search Report from a counterpart foreign application—EP15 00 1795; dated Nov. 26, 2015; 10 pages.

*Primary Examiner* — Mehmood B Khan
(74) *Attorney, Agent, or Firm* — Roach Brown McCarthy & Gruber, P.C.; Kevin D. McCarthy

(57) ABSTRACT

Providing distanced audio from a remote location using mobile devices, which a change in the orientation of a destination mobile device to a pointing orientation, aimed to an object of interest, is detected using an exploration application that is installed in advance on the mobile device. The azimuth to which the mobile device is currently pointing is calculated and all point and/or of objects of interest which are within a predetermined range from the pointing device, are detected. Then the exploration application automatically connects to a remote server which continuously collects the current location information of any user of a mobile device and maps its location with respect to stationary object or points of interests, or to moving objects. The server provides via the application, one or more audio alerts to the user of the destination device that one or more object or points of interest are in range.

13 Claims, 5 Drawing Sheets

(56) References Cited

U.S. PATENT DOCUMENTS

| | | | |
|---|---|---|---|
| 2008/0305806 A1* | 12/2008 | Jung | H04L 29/12783 455/456.1 |
| 2009/0319348 A1* | 12/2009 | Khosravy | G01C 21/20 705/14.1 |
| 2010/0268451 A1* | 10/2010 | Choi | G01C 21/3602 701/533 |
| 2011/0093515 A1* | 4/2011 | Albanese | G06Q 30/02 707/812 |
| 2011/0269481 A1* | 11/2011 | Halfmann | G01S 5/0027 455/456.1 |
| 2012/0077522 A1* | 3/2012 | Mate | H04N 21/2187 455/456.3 |
| 2012/0143500 A1* | 6/2012 | Taylor | G09B 27/04 701/454 |
| 2012/0295639 A1* | 11/2012 | Fitoussi | H04W 4/021 455/456.3 |
| 2013/0057746 A1* | 3/2013 | Takaoka | H04N 21/25841 348/333.01 |
| 2013/0099895 A1* | 4/2013 | Harpak | G06K 7/01 340/10.1 |
| 2013/0159463 A1* | 6/2013 | Bentley | H04L 67/10 709/217 |
| 2014/0132410 A1* | 5/2014 | Chang | G06F 3/014 340/539.11 |
| 2014/0171039 A1* | 6/2014 | Bjontegard | H04L 29/06034 455/414.1 |
| 2015/0057028 A1* | 2/2015 | Rudow | H04W 4/028 455/456.3 |
| 2015/0112857 A1* | 4/2015 | Gellis | G06Q 50/01 705/39 |
| 2015/0149287 A1* | 5/2015 | Brown | G06Q 30/0261 705/14.58 |
| 2015/0153191 A1* | 6/2015 | Ma | G01C 21/34 701/426 |
| 2015/0153571 A1* | 6/2015 | Ballard | G02B 27/017 345/8 |
| 2015/0198455 A1* | 7/2015 | Chen | G01C 21/3629 701/428 |
| 2015/0242895 A1* | 8/2015 | Brown | G06Q 30/0257 705/14.55 |
| 2015/0262208 A1* | 9/2015 | Bjontegard | G06Q 30/0205 705/7.31 |
| 2015/0373498 A1* | 12/2015 | Chizi | H04W 4/027 455/456.3 |
| 2016/0033268 A1* | 2/2016 | Abernathy | G01C 3/08 356/4.01 |
| 2016/0093154 A1* | 3/2016 | Bytnar | G07F 17/3218 463/25 |
| 2016/0212339 A1* | 7/2016 | Schacht | H04N 5/23219 |
| 2016/0272112 A1* | 9/2016 | DeGrazia | B60Q 9/00 |
| 2017/0026800 A1* | 1/2017 | Kim | H04W 4/026 |
| 2017/0093763 A1* | 3/2017 | Takaoka | H04L 51/04 |

* cited by examiner

METHOD AND SYSTEM FOR OBTAINING DISTANCED AUDIO BY A PORTABLE DEVICE

FIELD OF THE INVENTION

The present invention relates to the field of monitoring systems. More particularly, the invention relates to a system and method for obtaining distanced audio from a remote location using mobile devices.

BACKGROUND OF THE INVENTION

Using a mobile device (such as a cellular phone, a tablet a laptop computer etc.) for obtaining audio information from a remote location is a known method, according to which a cellular mobile device at the remote location is used as an "active microphone", which transmits audio data from the remote location (the source device) to another mobile device (the destination device), which collects the desired audio information. Audio data transmission from the source to the destination may be in the form of sending an audio file (recordation) which is performed by a user of the source device via a data network (such as the internet, WiFi, cellular or any other accessible wireless network). Alternatively, audio data transmission from the source to the destination may be in the form of audio streaming, where the microphone of the source is activated and transmits real time audio from the remote location. However, these existing solutions require dialing to the user of the source device and placing a call for obtaining the audio, and therefore, depend on the user's availability and cooperation.

It is therefore desired independently obtain distanced audio from a remote location using mobile devices.

It is an object of the present invention to provide a system and method for obtaining distanced audio from a remote location using mobile devices, which do not require dialing to the user of a mobile device and placing a call for obtaining the audio.

It is another additional object of the present invention to provide a system and method for obtaining distanced audio from a remote location using mobile devices, which independent of their user's availability and cooperation.

Other objects and advantages of the invention will become apparent as the description proceeds.

SUMMARY OF THE INVENTION

The present invention is directed to a method for providing distanced audio from a remote location using mobile devices, according to which a change in the orientation of a destination mobile device to a pointing orientation, aimed to an object of interest, is detected using an exploration application that is installed in advance on the mobile device. The azimuth to which the mobile device is currently pointing is calculated and all point and/or of objects of interest which are within a predetermined range from the pointing device, are detected. Then the exploration application automatically connects to a remote server which continuously collects the current location information of any user of a mobile device and maps its location with respect to stationary object or points of interests, or to moving objects. The server provides via the application, one or more audio alerts to the user of the destination device that one or more object or points of interest are in range. The user may interact with one or more object or points of interest. The user may also scan the surrounding space by obtaining the overall audio from all objects at once.

The pointing orientation may be automatically detected by using readings from the inherent location and orientation sensors of the mobile device. The point and/or of object of interest which that will be closer may be displayed first to the user.

In one aspect, a location map may be displayed with the detection range and the relative location between the destination device and changes in the location of the object of interest, along with a navigation path to the object of interest.

DETAILED DESCRIPTION OF PREFERRED EMBODIMENTS

The system and method of the present invention are capable of providing distanced audio from a remote location using mobile devices, which with no need for dialing to the user of a mobile device and placing a call for obtaining the audio, and are independent of their user's availability and cooperation. This way, the user of the mobile device at the destination can obtain more information and knowledge regarding point of interests, people or any physical object in a remote location, while avoiding any interaction with other users located in his vicinity.

According to the proposed method, the distanced audio can be obtained by using the destination mobile device as a pointing device, which may be aimed to an object of interest. For example, the user may walk in a street and point with his mobile device towards a bar nearby. A exploration application, which will be installed in advance on the mobile device, will automatically detect that the device is currently in its pointing orientation by using readings from its inherent sensors, such as acceleration sensors and orientation sensors (e.g., a gyro), as well as location data from the GPS. In turn, the application will calculate the azimuth to which the mobile device is currently pointing and detect that specific bar, as well as all point and/or of objects of interest which are within a predetermined range from the pointing device. The point and/or of object of interest which will be closer will be displayed first.

The exploration application will automatically connect to a remote server (via any data network that has access to the internet), which continuously collects the current location information of any user of a mobile device (source or destination devices which has the exploration application) and maps its location with respect to stationary object or points of interests (the location of which is stored in a database), or to moving objects, such as other users. The database will also have the association between moving objects, such as friends or relatives of each user, so whenever one of them will be detected to be in range, the user of the destination device will get an alert that one of more fiends of him are in range.

This process will allow the user to obtain the music inside the bar, without entering the bar. Furthermore, the user will be able to discover any object or a point of interest that he encounters, just by pointing toward the object and gaining its sound signature. The sound signature he receives in turn will be correlated with the object or with its meaning.

Figure 1:
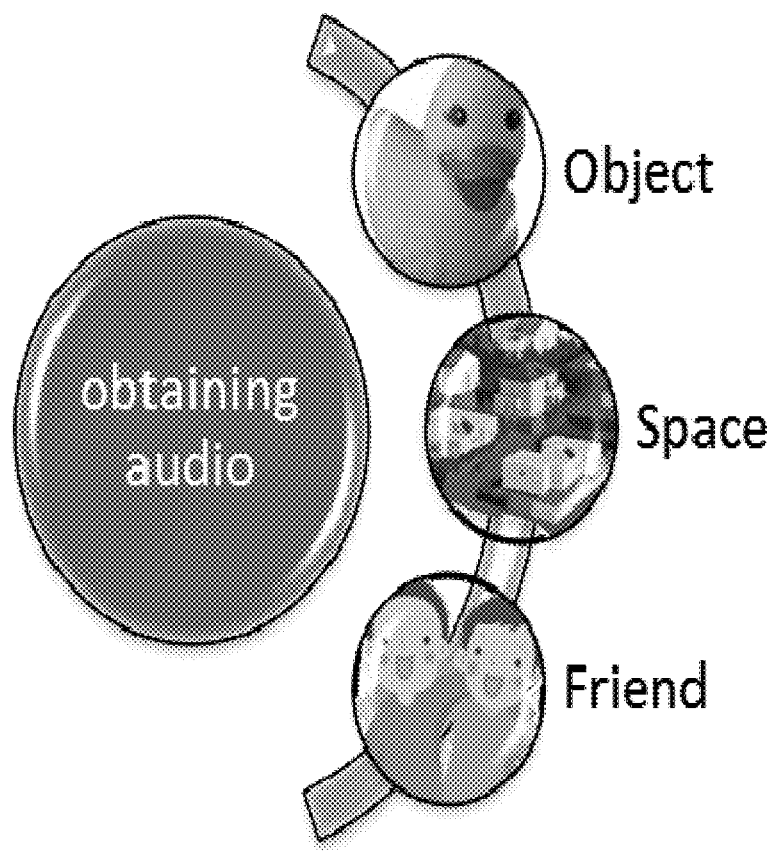
FIG. 1 is a schematic illustration of types of object and other users in an explored space.

According to an embodiment of the invention, a user can use his device for scanning the surrounding space by obtaining the overall audio from all objects at once. This will enable the user to discover objects in the entire space by receiving the surrounding sounds, as illustrated in FIG. 1.

According to another embodiment, a user can use his mobile device to obtain knowledge regarding other user in his vicinity.

Example 1: Another User (Holding the Source Device) is Standing Nearby

The user holding the destination device can obtain indications regarding the emotions (sad, happy etc.) of the other user by gaining an audio signal that is correlated with a specific emotion. Another option is to obtain the status of a user (available, busy etc.) for any kind of communication. This will be done also by getting an audio alert that reflects this status.

Example 2: A Distanced User

A user can locate other users by using his (destination) device to sense their audio. When the user will point toward a specific direction an audio signal (alert) will appear if another user is located in that direction. This audio signal will be the sound signature of the user from a database of sound signatures and their association with users. A technique of generating such a database is described for example in Israeli patent application IL 231527. According to this technique, a database of sound signatures which are uniquely associated with entities that are linked to a communication system is created, such that each entity records and uploads its profile and characteristic sound alerts to the database and then submits to the database an application for registering a sound signature which includes association to the entity. An official authority accepts or denies the registration of sound signatures as records in the database by examining the application and verifying that it complies with a set of predetermined criteria. if it complies, a license is granted to the sound signature database which is stored with association to the entity and its context. Each characteristic sound alert is analyzed according to predetermined criteria, to verify that it is appropriate and granting a permit to each examined characteristic sound alert that met the criteria. Finally, characteristic sound alerts that met the criteria are stored in the database, along with an association to the entity and his status, to be used as an alert for increasing awareness of users of the communication system to the entities.

Figure 2:
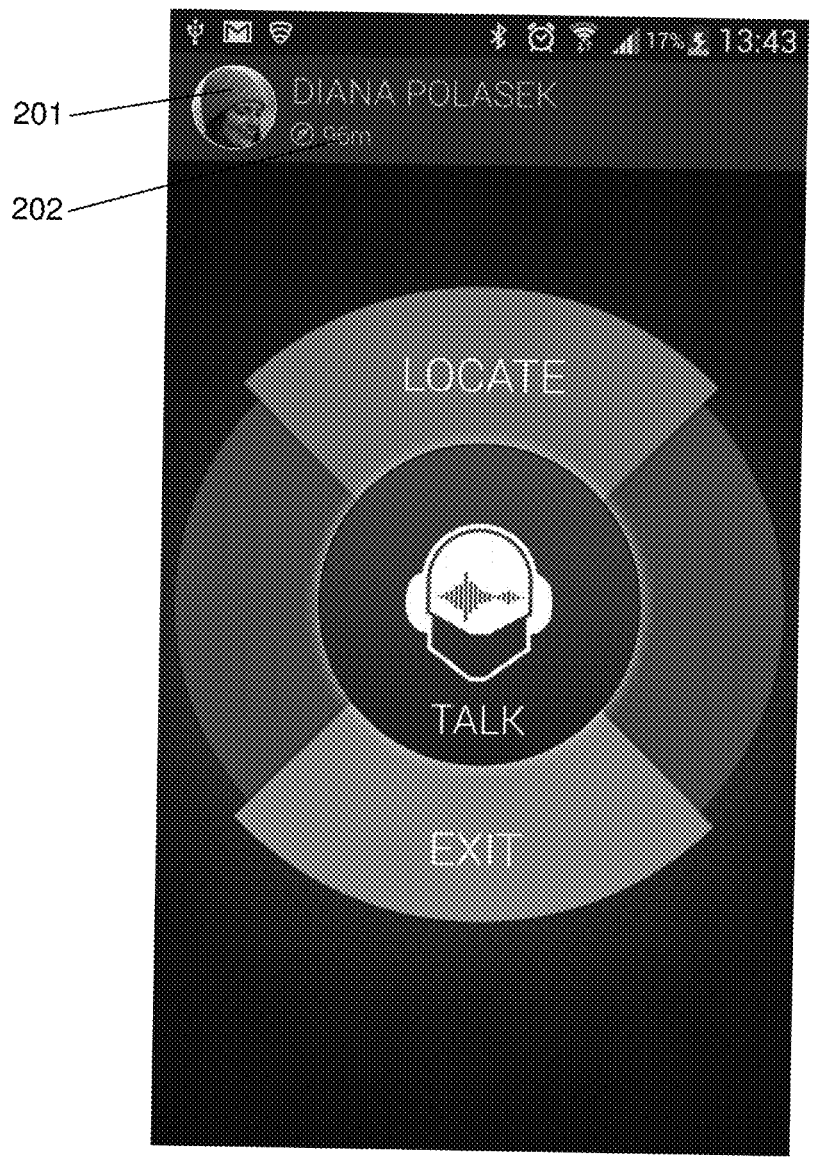
FIGS. 2-5 schematically illustrate exemplary interfaces of the exploration application, when a friend is in range of the destination device.

FIG. 2 illustrates an exemplary interface of the exploration application, when a friend is in range of the destination device. Here, the exploration application on the device detected that the user of the destination device pointed it to a direction (e.g., detected a change in its orientation in the user's pocket) and that the user named Diana Polasek (who is the user of the source device and also a friend of the user of the destination device) is in range and displays an icon 201 with her face, along with an indication 202 of the distance to her.

The exploration of the space and the detection of Diana were performed by the following process:

First, the application contacts the server and transmits the location of the destination device. In turn, the server queries a database and extracts the list of fiends of the user of the destination device. Then the server checks the location of each one, extracts the sound signature of each friend who is in range from the database and transmits the location data of all friends in range to the application, which displayed them, along with the sound signatures.

Figure 3:
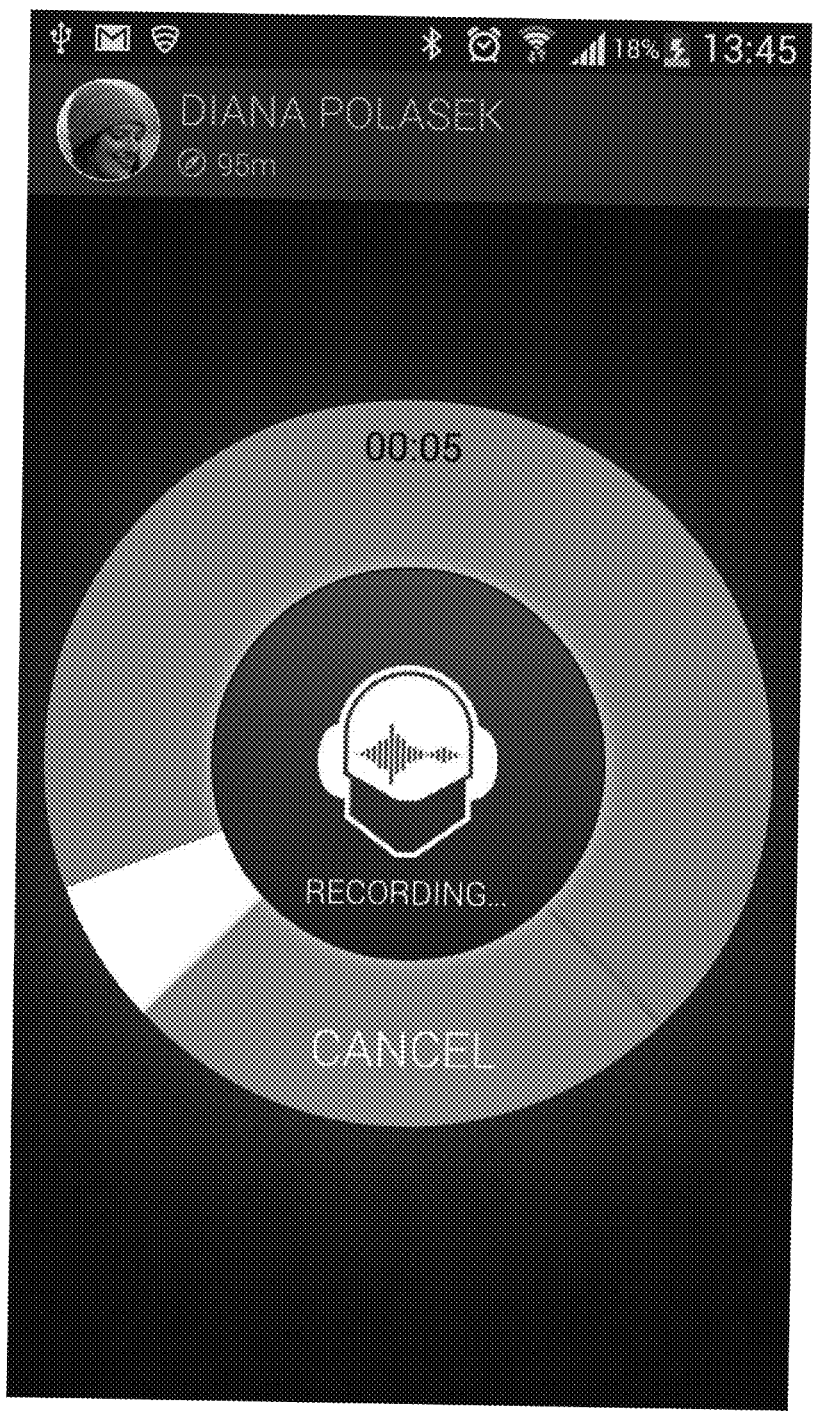

The interface offers the option to communicate with her (using the "locate" button) or to exit, if the user of the destination device does not wish to communicate. If he wishes to communicate, he can activate the "talk" button to speak (as shown in FIG. 3) or to record a voice message that will be sent to her as an audio file by the application, as shown in FIG. 3.

Figure 4:
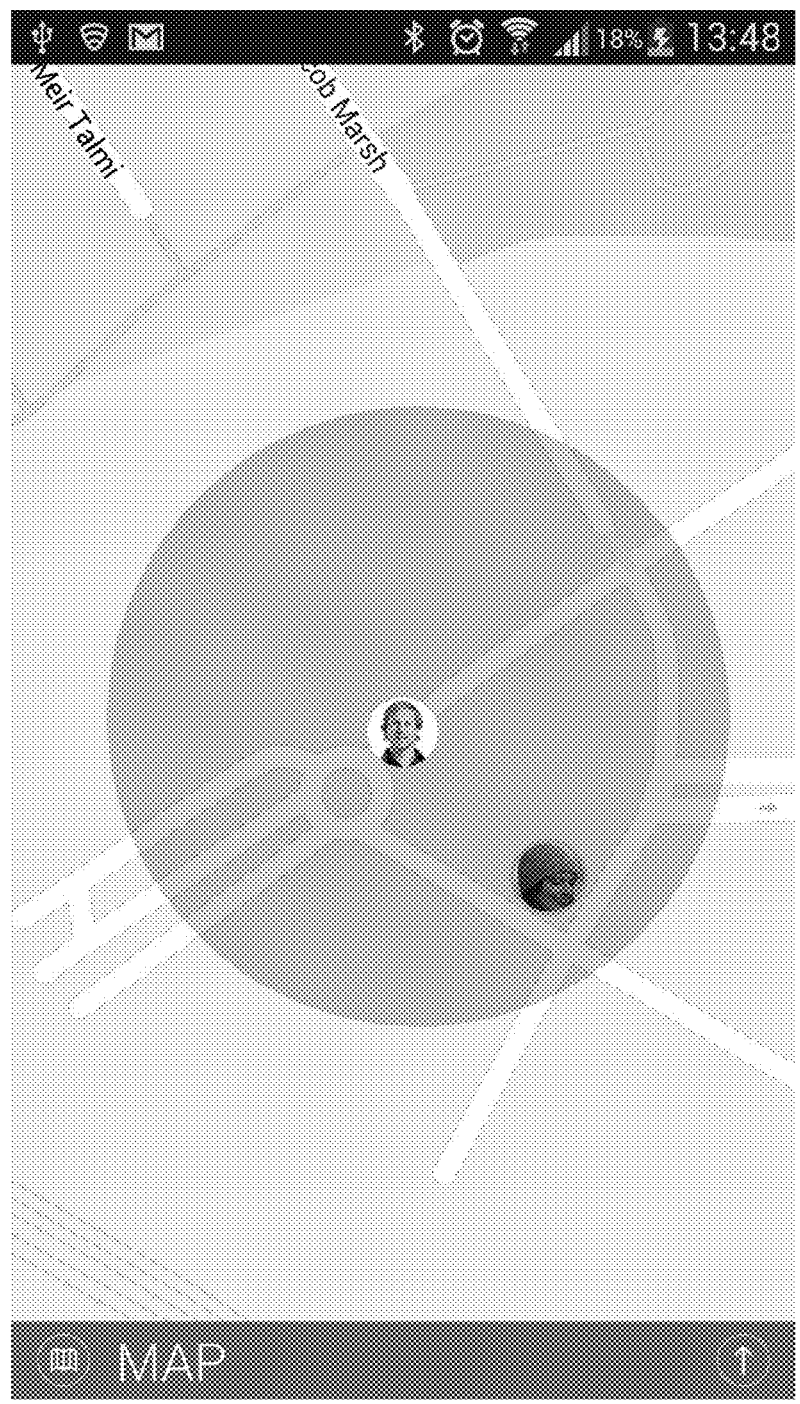

The application may also display a location map with the detection range (indicated by the circle) and the relative location between the destination device and the current location of her device, as shown in FIG. 4.

Figure 5:
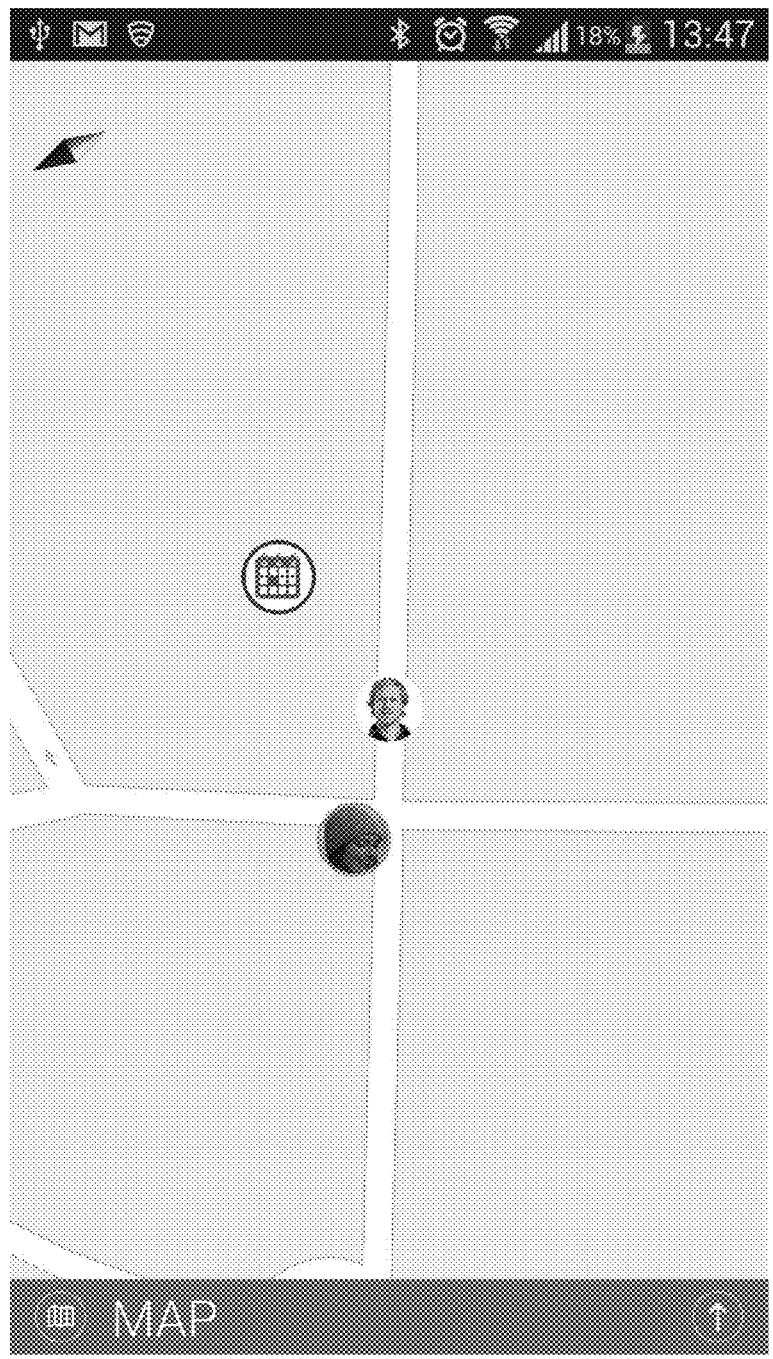

The application may also display changes in the location of her device, as shown in FIG. 5.

It is also possible to display a navigation path to her. In addition, the exploration application may also display other friends who are in range and add then to the session, to allow communication or interaction between them, as well.

Each user (of a source device) may use the exploration application to update his current status (such as his mood), in order to provide his status in the form of an audio alert to other users, regarding whether or not he is currently available for interaction.

The method proposed by the present invention allows unilateral exploration of the space nearby by a user of a destination mobile device, without the need to dial and establish a connection with other source devices. The user of a destination mobile device (the "exploring" device) only has to point toward a desired direction and in response, the exploration application will automatically detect the object and points/other users of interest on that direction.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for locating nearby available friends using mobile devices, comprising:
   a) installing an exploration application in advance on a plurality of location detectable mobile devices, in order to connect via a data network to a remote server and to be linked to a sound signature reflective of an availability status of a corresponding user of one or more of said mobile devices;
   b) uploading, from one or more of said plurality of mobile devices in conjunction with said exploration application, a corresponding availability status related sound signature to a database in communication with said remote server;
   c) unilaterally pointing with one of said mobile devices functioning as an exploring device in a specific direction without establishing a connection with any of said mobile devices, while the exploration application installed on said exploring device calculates the azimuth of said direction;
   d) detecting location data, by said remote server, of said exploring device and of all said mobile devices that are within a predetermined range from said exploring device following said pointing step and in the direction to which said exploring device is pointed;

e) extracting from said database, by said remote server, a list of friends of the user of said exploring device;

f) extracting from said database, by said remote server, a corresponding sound signature associated with all the detected mobile devices that are within said predetermined range and whose corresponding users are friends of the user of said exploring device;

g) transmitting, by said remote server, to the exploration application installed on said exploring device, the location data and the corresponding sound signature associated with all the detected mobile devices whose corresponding users are friends of the user of said exploring device;

h) by said exploring device in conjunction with the installed exploration application, displaying a corresponding icon representative of all the detected mobile devices whose corresponding users are friends of the user of said exploring device as well as a relative location of each of said corresponding icons; and i) interacting with one of the displayed icons and being provided in response with audio of the transmitted sound signature associated with said interacted icon to determine its availability status.

2. The method according to claim 1, wherein the pointing direction is automatically detected by the exploration application using readings from inherent location and orientation sensors of the exploring device, and the exploration application will then be automatically connected to the remote server.

3. The method according to claim 1, wherein the detected mobile device which is closest to the exploring device will be displayed first.

4. The method according to claim 1, wherein the user of the exploring device obtains at once the corresponding sound signature associated with all the detected mobile devices whose corresponding users are friends of the user of said exploring device, in response to the unilateral pointing step.

5. The method according to claim 1, further comprising displaying on a location map the predetermined range from the exploring device and the relative location between the exploring device and one or more of the detected mobile devices.

6. The method according to claim 1, further comprising displaying a navigation path to one or more of the mobile devices.

7. A system for locating available friends that are nearby to a mobile device user, comprising:

a) a plurality of location-detectable mobile devices, each of which comprising a processor on which is installed in advance an exploration application, wherein the application installed on one of said mobile devices functioning as an exploring device, which, when pointing in a specific direction, is adapted to calculate the azimuth of said direction;

b) a remote server, in data communication with each of said mobile devices, wherein said remote server is adapted to detect location data of said exploring device and of all said mobile devices that are within a predetermined range from said exploring device; and c) a database of stored sound signatures reflective of an availability status of a corresponding user of said plurality of mobile devices, to which a corresponding availability status related sound signature is uploadable from each of said plurality of mobile devices in conjunction with said exploration application and which is in data communication with said server, wherein said server is operable to— i) extract from said database, a list of friends of the user of said exploring device;

ii) extract from said database, a corresponding availability status related sound signature associated with all the detected mobile devices that are within said predetermined range and whose corresponding users are friends of the user of said exploring device;

iii) transmit to the exploration application installed on said exploring device, the location data and the corresponding availability status related sound signature associated with all the detected mobile devices whose corresponding users are friends of the user of said exploring device;

wherein the exploration application installed on said exploring device is also configured to display a corresponding icon representative of all the detected source devices, as well as a relative location of each of said corresponding icons, so that said exploration device will be provided with, upon interaction with one of the displayed icons, audio of the transmitted availability status related sound signature associated with said interacted icon.

8. The system according to claim 7, wherein the exploration application is configured to display a user interface that includes a locate initiating button, and wherein the remote server is adapted to transmit to the exploration application installed on the exploring device, following interaction with said locate initiating button, the location data and the corresponding availability status related sound signature associated with all the detected mobile devices whose corresponding users are friends of the user of said exploring device.

9. The method according to claim 1, wherein the corresponding sound signature is uniquely associated with one of the plurality of mobile devices.

10. The method according to claim 1, wherein one or more of the plurality of mobile devices is associated with a physical object.

11. The method according to claim 1, wherein the uploaded sound signature is also correlated with a mood status of the corresponding user.

12. The method according to claim 5, wherein changes in the relative location of the one or more mobile devices are displayed on the location map.

13. The method according to claim 1, wherein the user activates a button displayed on an application-related interface of the exploring device, after being provided with audio of the transmitted sound signature associated with the interacted icon, whereupon the exploring device receives streamed audio data from the mobile device associated with the interacted icon.

* * * * *